United States Patent
Singh et al.

(10) Patent No.: US 6,797,796 B2
(45) Date of Patent: Sep. 28, 2004

(54) COPOLYMER SEALANT COMPOSITIONS AND METHOD FOR MAKING

(75) Inventors: Navjot Singh, Clifton Park, NY (US); John Thomas Leman, Niskayuna, NY (US); John M. Whitney, Niskayuna, NY (US); Herman Otto Krabbenhoft, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/201,660

(22) Filed: Jul. 23, 2002

(65) Prior Publication Data

US 2003/0130466 A1 Jul. 10, 2003

Related U.S. Application Data

(62) Division of application No. 09/626,768, filed on Jul. 27, 2000, now Pat. No. 6,451,954.

(51) Int. Cl.[7] ............................................... C08G 77/04
(52) U.S. Cl. ........................... 528/35; 528/14; 528/42; 528/17; 528/18; 524/588; 524/431
(58) Field of Search .............................. 528/35, 14, 17, 528/18, 42; 524/588, 431

(56) References Cited

U.S. PATENT DOCUMENTS

| | | | |
|---|---|---|---|
| 3,109,826 A | 11/1963 | Smith et al. | |
| 3,202,634 A | 8/1965 | Merker | |
| 3,304,320 A | 2/1967 | Spencer | |
| 3,444,127 A | 5/1969 | Webb | |
| 3,576,020 A | 4/1971 | Loree et al. | |
| 3,576,021 A | 4/1971 | Grindahl | |
| 3,666,718 A | 5/1972 | Patterson et al. | |
| 4,366,323 A | 12/1982 | Rosenberg et al. | |
| 4,518,759 A | 5/1985 | Rosenberg et al. | |
| 4,818,805 A | 4/1989 | Ikeno et al. | |
| 5,236,997 A | 8/1993 | Fujki | |
| 6,072,016 A | 6/2000 | Kobayashi et al. | |
| 6,184,269 B1 | 2/2001 | Abu-Isa et al. | |
| 6,451,954 B1 | 9/2002 | Singh et al. | |

OTHER PUBLICATIONS

"Exactly Alternating Silarylen–Siloxane Polymers, 10, Synthesis and Characterization of Siphenylene–Siloxane Polymers Containing Fluoroalkyl and Hydrido Side Groups," P.R. Dvornic, R.W. Lenz, 6019 Macromolecules, 27 (Sep. 26, 1994), No. 20, pp. 5833–5838.

"Exactly Alternating Silarylen–Siloxane Polymers, 9, Relationships between Polymer Structures and Glass Transition Temperature," P.R. Dvornic, R.W. Lenz, 6019 Macromolecules, 25 (Jul. 6, 1992), No. 14, pp. 3769–3778.

Grassie and Beattie, "The Thermal Degradation of Polysiloxanes; Part 7", Polymer Degradation and Stability, 8:177–193 (1984).

Dvornic and Lenz, Macromolecules, 25, 3769 (1992).

*Primary Examiner*—Margaret G. Moore
(74) *Attorney, Agent, or Firm*—Kimberly H. Parker; Patrick K. Patnode

(57) ABSTRACT

Condensation curable poly(fluoroorgano)siloxane-poly(silarylene)siloxane block copolymer compositions having a glass transition temperature not exceeding about −54° C. and excellent solvent resistance have been found useful as sealants. Polyalkoxysilylorgano compounds, such as 1,4-bis[trimethoxysilyl(ethyl)]benzene have been found to be effective as cross-linkers.

34 Claims, No Drawings

COPOLYMER SEALANT COMPOSITIONS AND METHOD FOR MAKING

CROSS-REFERENCE TO RELATED APPLICATIONS

This application is a divisional of application Serial No. 09/626,768, filed July, 27, 2000, now 6,451,954, which is hereby incorporated by reference in its entirety.

The present invention is based on work sponsored under NASA's High Speed Research Contract NASI 20220, with Boeing under subcontract ZA0073 Task 22, Subtask 4.2.2.4.

BACKGROUND OF THE INVENTION

The present invention is directed to copolymer compositions useful in the preparation of fuel tank sealants. More particularly, the present invention relates to condensation curable poly(fluoroorgano)siloxane-poly(silarylene) siloxane block copolymer compositions and the use of polyalkoxysilylorganic compounds as cross-linkers to facilitate the condensation cure of poly(fluoroorgano)siloxane-poly(silarylene)siloxane block copolymers.

As shown by Smith, U.S. Pat. No. 3,109,826, bis (alkoxysilyl) hydrocarbons, such as 1,2-bis-(triethoxysilyl) ethane, can be used as cross-linkers in combination with a metal salt to effect the neutral condensation cure of hydroxy end-blocked polydiorganosiloxanes. However, the resulting cured silicone compositions have been found to be problematic as aircraft fuel tank sealants, as they do not have the required solvent or fuel resistance. It is known that fluorosilicones, for example, made by polymerizing tris [(trifluoropropyl)methyl]cyclosiloxane, can provide excellent fuel resistance. However, fluorosilicones often do not meet the wide temperature stability requirements needed in aircraft sealants, such as temperatures in a range between −54° C. and 177° C. over an extended period of time. In addition, fluorosilicones are subject to depolymerization which can result in the formation of low molecular weight cyclics.

In an effort to enhance the thermal stability of fluorosilicones, non-siloxane groups, such as p-silphenylene, have been inserted into the polyfluorosiloxane backbone, as shown by Grassie and Beattie, "The Thermal Degradation of Polysiloxanes: Part 7", Polymer Degradation and Stabilization 8:177–193 (1984). It is also reported by Dvornic and Lenz, Macromolecules, 25, 3769 (1992), that copolymers having a glass transition temperature (Tg) of −51° C. can be made by reacting methyl(3,3, 3-trifluoropropyl)silanediol and 1,4-bis (dimethylhydroxysilyl)benzene.

While fluorosilicones having improved thermal stability have been made by inserting non-siloxane groups, such as p-silphenylene into the polyfluorosiloxane backbone, such copolymers have been found to have a glass transition temperature which does not satisfy the minimum −54° C. Tg flexibility requirements of aircraft fuel tank sealants.

Experience also has shown that in addition to being sensitive to depolymerization, condensation curable fluorosilicone compositions often suffer from an incomplete cure using a conventional curing catalyst, such as a tin salt, and a standard neutral condensation curable cross-linker, for example a polyalkoxysilane. One possible explanation, as discussed by Fujiki, U.S. Pat. No. 5,236,997, is that the steric hindrance or electronic effects of bulky terminal trifluoropropyl groups inhibit crosslinking of the network.

Accordingly, depolymerization resistant silicone base copolymers which could be compounded to a fuel resistant condensation curable silicone composition convertible to the elastomeric state upon cure exhibiting stability over an operable temperature in a range between about −54° C. or below and at least about 177° C. over an extended period of time are constantly being sought which also exhibit low temperature flexibility, in addition to high temperature stability.

BRIEF SUMMARY OF THE INVENTION

The present invention provides a condensation curable poly(fluoroorgano)siloxane-poly(silarylene)siloxane block copolymer exhibiting a glass transition temperature not exceeding about −54° C.

A further embodiment of the present invention provides a method for making a poly(fluoroorgano)siloxane-poly (silarylene)siloxane copolymer comprising effecting reaction between a bis(diorganohydroxysilyl)arylene and a poly (fluoroalkylorgano)cyclopolysiloxane.

In yet a further embodiment of the present invention, there is provided a neutral condensation curable poly (fluoroorgano)siloxy-poly(silarylene)siloxane block copolymer sealant composition comprising (a) a poly(fluoroorgano)siloxane-poly(silarylene)siloxane block copolymer, (b) a cross-linker, and (c) a condensation catalyst.

In yet another embodiment of the present invention, there is provided a method for making a neutral condensation curable poly(fluoroorgano)siloxy-poly(silarylene)siloxane block copolymer sealant composition which comprises (a) effecting reaction between bis(diorganohydroxysilyl) arylene and poly(fluoroalkylorgano)cyclopolysiloxane to form a condensation curable poly(fluoroorgano) siloxane-poly(silarylene)siloxane block copolymer, (b) shearing the copolymer, and (c) blending a cross-linker and a condensation catalyst with the copolymer to form a sealant.

DETAILED DESCRIPTION OF THE INVENTION

The poly(fluoro)organosiloxane-poly(silarylene)siloxane block copolymers, or "block copolymers" within the scope of the present invention, can be used to make aircraft fuel tank sealants having property profiles which include a glass transition temperature (Tg) of about −54° C. or below and can be made by the ring opening polymerization of a poly(fluoroalkylorgano)cyclopolysiloxane in the presence of a bis(diorganohydroxysilyl)arylene.

As used hereinafter, the term "bis(diorganohydroxysilyl) arylene", or "bis(hydroxysilyl)arylene" is shown by the formula,

$$(HO-(R)_2Si)_2-Q^1, \qquad (I)$$

and the term "silarylenesiloxy" can be represented by the formula,

$$-(R)_2SiQ^1Si(R)_2O-, \qquad (II)$$

where $Q^1$ is a $C_{(6-12)}$ divalent aromatic organic radical, and R is a $C_{(1-4)}$ alkyl radical. Preferably, the bis (diorganohydroxysilyl)arylene is 1,4-bis (dimethylhydroxysilyl)benzene.

"Poly(fluoroalkylorgano)cyclopolysiloxane", sometimes expressed as "poly(fluoroalkyl)cyclic siloxane" is shown by the following formula:

$$[(R^1)(R^2)SiO]_a, \quad (III)$$

where $R^1$ is a $C_{(3-8)}$ polyfluoroalkyl radical, $R^2$ is a $C_{(1-12)}$ organic radical, and "a" is an integer in a range between about 3 and about 8 inclusive, and preferably 3 or 4. Poly(fluoroalkylorgano)cyclopolysiloxane can be used in a proportion in a range between about 0.5 and about 4 moles, and preferably in a range between about 1 and about 2 moles, per mole of bis(diorganohydroxysilyl)arylene. Reaction to form the copolymer is typically effected with agitation under neat conditions or in the presence of an inert organic solvent, for example, toluene, at temperatures in a range between about 60° C. and about 150° C. Reaction is typically effected for a time period in a range between about 30 minutes and about 2 hours, and preferably, in a range between about 45 minutes and about 1.5 hours. It is preferred to operate within an inert atmosphere, for example, under a nitrogen blanket. Typically, there is also present an initiator, for example, an alkali hydroxide (e.g. sodium hydroxide) or an alkali fluorosilanolate (e.g. sodium fluorosilanolate) in a range between about 5 parts per million (ppm) and about 50 ppm, based on the weight of reaction mixture, and a quencher, for example, phosphoric acid or silyl phosphate in a range between about 10 ppm and about 60 ppm, based on the weight of reaction mixture.

$C_{(1-4)}$ alkyl radicals which are included within R are, for example, methyl, ethyl, propyl and butyl; $C_{(3-8)}$ polyfluoroalkyl radicals which are included within $R^1$, include but are not limited to, for example, trifluoropropyl units, tridecafluoro-1,1,2,2-tetrahydrooctyl units, nonafluoro-1,1,2,2-tetrahydrohexyl units, and pentafluoro-1,1,2,2-tetrahydrobutyl units. Radicals included within $R^2$ include, but are not limited to, for example, methyl, ethyl, propyl, butyl, and phenyl.

Among the poly(fluoroalkylorgano)cyclopolysiloxanes there is preferably included tris[(trifluoropropyl)methyl]cyclosiloxane.

The sealant composition of the present invention includes a bis(polyalkoxysilyl)organo cross-linker having the formula, $$[(RO)_2(X)Si]_2Q, \quad (IV)$$

where Q is a $C_{(2-12)}$ divalent organic radical, R is as previously defined, and X is a member selected from the group consisting of R and RO. Some of the $C_{(2-12)}$ divalent hydrocarbon radicals included within Q are dialkylene radicals such as dimethylene, trimethylene, tetramethylene, pentamethylene, and hexamethylene. Also included are divalent arylene radicals, for example, phenylene, tolylene, xylylene and naphthylene. Divalent aromatic organic radicals included within Q are for example phenylene, tolylene, xylylene and naphthylene.

The cross-linker can be used in combination with an effective amount of a condensation catalyst, such as a tin compound, to effect the neutral condensation cure of block copolymers comprising blocks of poly[(fluoroorgano)organo]siloxy units chemically combined with poly(silylarylene)siloxane groups. The block copolymers are referred to as "poly(fluoro)organosiloxane-poly(silarylene) siloxane block copolymers".

The sealant composition of the present invention is preferably made by initially compounding the poly(fluoroorgano)siloxane-poly(silarylene)siloxane copolymer, or "block copolymer" into a curable sealant base, or masterbatch under shearing conditions. Shearing can be effected at a temperature in a range between about 25° C. and about 200° C., preferably, in a range between about 100° C. and about 150° C., at atmospheric pressure, and preferably under inert conditions, such as under an inert gas, for example nitrogen, in a mixer, for example, a double-planetary mixer. Shearing can be carried out over a period in a range between about 15 minutes and about 4 hours, preferably in a range between about 1 hour and about 2 hours.

The block copolymer can be blended with a filler which can include a reinforcing filler, such as fumed silica, or a combination thereof with an extending filler, such as diatomaceous earth, precipitated silica, ground quartz, or calcium carbonate. It is preferred to use fumed silica which has been pretreated with an effective amount of a cyclic siloxane, such as octamethylcyclotetrasiloxane, or a mixture thereof with an organosilazane, such as hexamethyldisilazane. A proportion of filler in a range between about 0 parts and about 30 parts by weight, per 100 parts of block copolymer can be used. Preferably, the filler is present in a range between about 5 parts and about 15 parts by weight per 100 parts of block copolymer. A heat stabilizer, such as iron oxide, in a range between about 0.1 and about 10 parts by weight, per 100 parts of block copolymer has been found to be effective.

After blending of the masterbatch ingredients, the mixture can be degassed under reduced pressure, and the resulting paste can be stored.

The neutral condensation curable poly(fluoroorgano)siloxane-poly(silarylene)siloxane copolymer sealant compositions can be made by blending the block copolymer masterbatch with an effective amount of a condensation catalyst and a suitable bis(polyalkoxysilyl)organo cross-linker, referred to hereinafter sometimes as "cross-linker". "Neutral" as used herein refers to a sealant composition which is substantially acid-free and substantially base-free.

Suitable condensation catalysts are present in a range between about 0.1 and about 2 parts, per 100 parts of block copolymer and include, for example, organometal compounds such as dibutyltin diacetate, dimethyltin neodecanoate, dibutyltin dilaurate, stannous octoate, dimethyltin hydroxyoleate, or combinations thereof.

Some of the preferred bis(polyalkoxysilyl)organo cross-linkers included within formula (1) are, for example, 1,2-bis(triethoxysilyl)ethane, 1,6 bis(trimethoxysilyl)hexane, 1,4-bis [trimethoxysilyl(ethyl)]benzene, 1,2-bis (methyldiethoxysilyl)ethane, and 1,6-bis (methyldiethoxysilyl)hexane. The cross-linkers are present in a range between about 1 and about 20 parts, per 100 parts of block copolymer.

In order that skilled in the art will be better able to practice the present invention, the following examples are given by way of illustration and not by way of limitation. All parts are by weight unless otherwise indicated.

EXAMPLE 1

A poly(fluoroorgano)siloxane-poly(silarylene)siloxane block copolymer useful in making a condensation curable sealant composition was prepared as follows:

A mixture of 2.26 grams (g) (0.010 mole) of 1,4-bis (dimethylhydroxysilyl)benzene and 9.42 g (0.020 mole ) of tris[(trifluoropropyl)methyl]cyclosiloxane was heated with stirring to about 150° C. under a nitrogen atmosphere. There was then added 0.04 g of sodium fluorosilanolate. After 60 minutes at 150° C., there was added to the mixture 0.065 g of a silyl phosphate. The reaction mixture was maintained with stirring for an additional at 150° C. and then allowed to cool. Based on method of preparation, there was obtained a block copolymer, including chemically combined blocks of 1,4-dimethylsilylphenylenesiloxane units and blocks of methyl(3,3,3-trifluoropropyl)siloxane units. A silicon-29 nuclear magnetic resonance spectrum indicated the 1,4-phenylenedimethylsiloxane:methyl(3,3,3-trifluoropropyl) disiloxane ratio to be 1:5.7 as compared to the theoretical of 1:6. Based on gel permeation chromatography (GPC), its weight averaged molecular weight was 151,297; number average molecular weight=90,292; differential scanning calorimetry (DSC) indicated a Tg of −63° C., measured at a rate of 10° C. per minute.

EXAMPLE 2

A viscous red sealant paste useful in making condensation curable sealant compositions was prepared as follows from a block copolymer made in accordance with the method of Example 1. The block copolymer was initially compounded in a Baker-Perkins double-planetary mixer for 1 hour under a nitrogen blanket with a silazane/octamethylcyclotetrasiloxane treated fumed silica, and red iron oxide. A homogeneous filler dispersion was prepared based on the use of 1324 parts of block copolymer, 105 parts of treated fumed silica having a surface area of 200 square meters per gram (m²/g), and 75 parts of red iron oxide with a particle size of 5 microns.

Shearing was maintained for 2 hours while applying heat and vacuum to the system. The planetary mixer was maintained at a temperature of 150° C. The viscous red sealant paste was then discharged while slightly above room temperature into a 4 liter (L) Semco® 1350 apparatus of PRC Desoto Inc of Mount Laurel, N.J. and then dispensed into 6 ounce Semco cartridges.

Several neutral condensation curable sealant compositions were prepared by blending in a Semco 388 mixer, 4 parts of a bis(polyalkoxysilyl) $C_{(2-10)}$ hydrocarbon cross-linker and 100 parts of the above block copolymer red sealant paste contained in a Semco cartridge. The respective neutral condensation curable sealant compositions are identified in the tables below by the particular bis(polyalkoxysilyl)Q cross-linker, where Q is as previously defined. More particularly, the bis(polyalkoxysilyl)Q cross-linkers include 1,2-bis(triethoxysilyl)ethane, or "BTSE", 1,6-bis(trimethoxysilyl)hexane, or "BTMSHEX", and 1,4-bis[trimethoxysilyl(ethyl)]benzene, or "BTMSEB".

There was also mixed with the respective red sealant paste blends of block copolymer and cross-linker, 0.5 part of dibutyltindiacetate, or "DBTA", as a condensation catalyst. Test specimens were prepared by compression molding the respective catalyzed formulations at ambient temperatures into 4 inch×5 inch×0.08 inch sheets. The sheets were allowed to cure to the elastomeric state for a minimum of 7 days at 25° C. and 50% relative humidity (RH).

Tensile properties, such as tensile strength (psi), elongation (%), and 100% modulus (psi) of each of the respective compression molded elastomeric sheets were then measured after a series of seven day test periods. The initial test period, "A", was standard cure at room temperature at 50% RH. Another test period, "B", was heat aging at 177° C. for 7 days after standard cure. There was also included, "C", immersion in Jet A fuel at 60° C. for 7 days after standard cure, and, "D", 2 days in Jet A at 60° C. followed by 5 days in air at 177° C. after standard cure. The following results were obtained, where the respective cross-linked condensation cured compositions are denoted by their previously identified cross-linkers, namely BTMSEB, BTSE and BTMSHEX:

| | 7 Day Test Periods | | |
|---|---|---|---|
| | Tensile Strength (psi) | Elongation (%) | 100% Modulus |
| | A | | |
| BTMSEB | 250 | 196 | 104 |
| BTSE | 227 | 212 | 87 |
| BTMSHEX | 227 | 178 | 110 |
| | B | | |
| BTMSEB | 273 | 213 | 100 |
| BTSE | 239 | 185 | 115 |
| BTMSHEX | 268 | 196 | 116 |
| | C | | |
| BTMSEB | 151 | 139 | 94 |
| BTSE | 146 | 145 | 88 |
| BTMSHEX | 192 | 92 | — |
| | D | | |
| BTMSEB | 291 | 212 | 111 |
| BTSE | 253 | 186 | 122 |
| BTMSHEX | 275 | 191 | 121 |

The above results show that the copolymers of the present invention are depolymerization resistant and provide neutral condensation curable compositions which are useful as solvent resistant sealants.

The crosslinker in the present invention can be employed in non-corrosive cure systems to fabricate elastomers useful as fuel resistant sealing materials, electronic encapsulation, and in applications requiring chemically resistant materials. Particularly, the crosslinkers can be used for preparation of fuel tank sealants.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed:

1. A method for making a neutral condensation curable poly(fluoroorgano)siloxy-poly(silarylene)siloxane block copolymer sealant composition which comprises the following steps:

(a) effecting reaction between a bis(diorganchydroxysilyl) arylene and a poly(fluoroalkylorgano) cyclopolysiloxane to form a condensation curable poly(fluoroorgano)siloxane-poly(silarylene)siloxane block copolymer, (b) shearing the copolymer, and (c) blending a cross-linker and a condensation catalyst with the copolymer to form a sealant.

2. The method in accordance with claim 1, wherein the method further comprises blending a filler with the copolymer.

3. The method in accordance with claim 2, wherein the filler is present in a range between about 0 parts and about 30 parts by weight per 100 parts of copolymer.

4. The method in accordance with claim 3, wherein the filler is present in a range between about 5 parts and about 15 parts by weight per 100 parts of copolymer.

5. The method in accordance with claim 2, wherein the filler comprises fumed silica.

6. The method in accordance with claim 1, wherein the method further comprises blending a heat stabilizer.

7. The method in accordance with claim 6, wherein the heat stabilizer is present in a range between about 0.1 parts and about 10 parts by weight per 100 parts of copolymer.

8. The method in accordance with claim 6, wherein the heat stabilizer comprises iron oxide.

9. The method in accordance with claim 1, wherein the cross-linker comprises the formula

[(RO)$_2$(X)Si]$_2$Q, where Q is a C$_{(2-12)}$ divalent organic radical, R is a C$_{(1-4)}$ alkyl radical, and X is a member selected from the group consisting of R and RO.

10. The method in accordance with claim 9, wherein the cross-linker comprises 1,4-bis[trimethoxysilyl(ethyl)]benzene, 1,2-bis(triethoxysilyl)ethane, 1,6-bis(trimethoxysilyl)hexane, or combinations thereof.

11. The method in accordance with claim 10, wherein the cross-linker comprises 1,2-bis(triethoxysilyl)ethane.

12. The method in accordance with claim 1, wherein the cross-linker is present in a range between about 1 parts and about 20 parts by weight per 100 parts of copolymer.

13. The method in accordance with claim 1, wherein the condensation catalyst is present in a range between about 0.1 parts and about 2 parts by weight per 100 parts of copolymer.

14. The method in accordance with claim 1, wherein the condensation catalyst comprises an organo-metal compound.

15. The method in accordance with claim 14, wherein the organo-metal compound comprises dibutyltin diacetate, dimethyltin neodecanoate, dibutyltin dilaurate, stannous octoate, dimethyltin hydroxyoleate, or combinations thereof.

16. The method in accordance with claim 15, wherein the organo-metal compound comprises dibutyltin diacetate.

17. The method in accordance with claim 1, wherein the reaction of step (a) is conducted at a temperature in a range between about 60° C. and about 150° C.

18. The method in accordance with claim 1, wherein the reaction of step (a) further comprises an initiator.

19. The method in accordance with claim 18, wherein the initiator is present in a range between about 5 ppm and about 50 ppm.

20. The method in accordance with claim 18, wherein the initiator comprises an alkali fluorosilanolate.

21. The method in accordance with claim 1, wherein the reaction further comprises a quencher.

22. The method in accordance with claim 21, wherein the quencher is present in a range between about 10 parts per million and about 60 parts per million.

23. The method in accordance with claim 21, wherein the quencher comprises a silyl phosphate.

24. The method in accordance with claim 1, wherein shearing occurs at a temperature in a range between about 25° C. and about 200° C.

25. The method in accordance with claim 24, wherein shearing occurs at a temperature in a range between about 100° C. and about 150° C.

26. The method in accordance with claim 1, wherein the shearing occurs for a period of time in a range between about 15 minutes and about 4 hours.

27. The method in accordance with claim 26, wherein the shearing occurs for a period of time in a range between about 1 hour and about 2 hours.

28. The method in accordance with claim 1, wherein the poly(fluoroalkylorgano)cyclopolysiloxane is present in a range between about 0.5 moles and about 4 moles, per mole of bis(diorganohydroxysilyl)arylene.

29. The method in accordance with claim 28, wherein the poly(fluoroalkylorgano)cyclopolysiloxane is present in a range between about 1 moles and about 2 moles, per mole of bis(diorganohydroxysilyl)arylene.

30. The method in accordance with claim 1, wherein the bis(diorganohydroxysilyl)arylene comprises the formula (HO—(R)$_2$Si)$_2$—Q$^1$,   (I)

where Q$^1$ is a C$_{(6-12)}$ divalent aromatic organic radical, and R is a C$_{(1-4)}$ alkyl radical.

31. The method in accordance with claim 30, wherein the bis(diorganohydroxysilyl)arylene comprises 1,4-bis(dimethylhydroxysilyl)benzene.

32. The method in accordance with claim 1, wherein the poly(fluoroalkylorgano)cyclopolysiloxane comprises the formula

[(R$^1$)(R$^2$)SiO]$_a$,   (III)

where R$^1$ is a C$_{(3-8)}$ polyfluoroalkyl radical, R$_2$ is a C$_{(1-2)}$ organic radical, and "a" is an integer in a range between about 3 and about 8 inclusive.

33. The method in accordance with claim 32, wherein the poly(fluoroalkylorgano)cyclopolysiloxane comprises tris[(trifluoropropyl)methyl]cyclosiloxane.

34. A method for making a neutral condensation curable poly(fluoroorgano)siloxy-poly(silarylene)siloxane block copolymer sealant composition which comprises the following steps:

(a) effecting reaction between 1,4-bis(dimethylhydroxysilyl)benzene and tris[(trifluoropropyl)methyl]cyclo siloxane in the presence of sodium fluorosilanolate and silyl phosphate at a temperature in a range between about 60° C. and about 150° C. to form a condensation curable poly(fluoroorgano)siloxane-poly(silarylene)siloxane block copolymer, (b) shearing the copolymer at a temperature in a range between about 100° C. and about 150° C. for a period of time in a range between about 1 hour and about 2 hours, and (c) blending the copolymer with 1,2-bis(triethoxysilyl)ethane, dibutyltin diacetate, fumed silica, and iron oxide to form the copolymer sealant.

* * * * *